M. P. COONS.
CARBURETER.
No. 80,918. Patented Aug. 11, 1868.
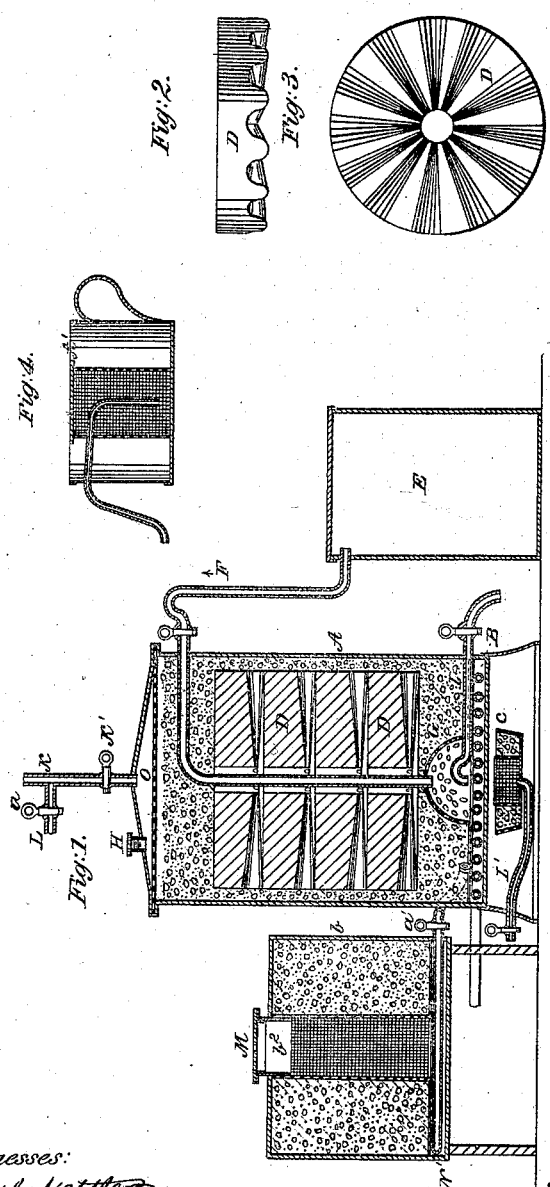
Witnesses:
W. C. Ashkettle
Wm. A. Morgan
Inventor:
M. P. Coons
per Munn & Co.
Attorneys

UNITED STATES PATENT OFFICE.

M. P. COONS, OF BROOKLYN, NEW YORK.

IMPROVED CARBURETOR.

Specification forming part of Letters Patent No. 80,918, dated August 11, 1868.

*To all whom it may concern:*

Be it known that I, M. P. COONS, of Brooklyn, in the county of Kings and State of New York, have invented a new and useful Improvement in Air and Gas Carbonizers; and I do hereby declare that the following is a full, clear, and exact description thereof, which will enable others skilled in the art to make and use the same, reference being had to the accompanying drawings, forming part of this specification, in which—

Figure 1 represents a central sectional elevation of my improved apparatus. Fig. 2 represents a side view of a disk, of brick or other absorbing material, used for distributing the pumice-stone in the retort; and Fig. 3 represents a plan view of the same.

Similar letters of reference indicate like parts.

The nature of my invention relates to improvements in apparatus for carbonizing atmospheric air or coal-gas for illuminating, heating, and other purposes by the use of petroleum-oil, either in a crude state or in a refined state in its several grades, as will be more fully described on reference to the accompanying drawings.

I provide a retort, which is made of any suitable material to give the proper degree of strength, and of any desired form or size; but I prefer, for cheapness and durability, to construct it of cast-iron and in the form represented by the accompanying drawings, which I find to be economical in space, but which is of sufficient capacity to render the use of a gasometer unnecessary, whereby no accumulation of gas need be held in reserve, which very materially lessens the danger of explosion, and whereby a very simple and compact apparatus is provided, that may be placed in any public or private building, and by reason of having no gasometer nor unabsorbed fluids, requiring no particular grade or level for its operation, it may therefore be placed on any vessel, either for river, lake, or ocean navigation, and successfully operated thereon, no matter how great may be the rolling and pitching motion of the same. It is provided, also, as will be seen, with means for regulating the temperature to any required degree, producing an apparatus by which illumination is afforded of almost universal application, simple and cheap in construction, and safe in operation, rendering property in no wise extra hazardous, and in no respect liable to get out of order for an indefinite number of years. At the bottom of the retort I place a coil of steam-tubing, as shown at B, having an inlet and outlet aperture, as in the usual manner where steam is used for heating.

F represents a tube leading from an air-chamber, E, which is provided with an apparatus having air-accumulating functions, by which atmospheric air is forced into the retort A and delivered near the bottom under a perforated hollow semi-spherical inverted vessel G, by which the air is divided and distributed in minute particles as it is forced through the said vessel, the purpose of which will be hereinafter shown.

Above the coil of steam-pipe I place another tube, I, which is bent at the inner end into the form of a siphon and extended under the said air-distributing vessel, the other end projecting out of the retort and provided with a stop-cock for a purpose which will be hereinafter seen. I now fill the space from the bottom of the retort to a line even with the top of the distributing-vessel G with broken pumice-stone, in which I then place a series of layers of porous brick, made in sections and provided with corrugated faces, as shown at D D, filling the interstices with partially-pulverized pumice-stone, as shown in Fig. 1; or, in the absence of such brick, I use pumice-stone or any other non-combustible porous matter broken into fragments of any suitable size, with which I fill the retort near to the top surface, over which a fine wire-cloth is placed and secured with the cover, as represented in Fig. 1 at O, the object of which will be shown hereinafter.

K represents the distributing or discharge pipe, which is provided with a stop-cock, K'.

L represents a section of a branch pipe leading from the distributing-pipe to a gas-burner, C, underneath the retort, the use of which will be explained hereinafter.

H represents an aperture in the top of the retort for the admission of refined petroleum-oil, of which I prefer the grade known as "gasoline."

The operation of producing illumination by means of carbonizing atmospheric air is as follows: The oil, being introduced in sufficient quantity through the aperture H, is disseminated by the screen O over the surface of the pumice-stone to a great extent and absorbed thereby. If any surplus remains, it is drawn off through the tube I, after which the air is forced in through the tube F and discharged under the distributer G, from which it permeates upward through the myriads of pores of the saturated substance within the retort, and thereby becomes thoroughly amalgamated with the carbon contained in the oil, and when emitted from the discharge-pipe K a brilliant illumination is produced by combustion, emanating from the common air which has been carbonized by passing through the oil in the manner described.

The object of the wire-cloth, the meshes of which must not be less than ninety to the inch, is to prevent ignition of the matter within the retort, as by reason of the fineness of the texture of the cloth the fire will not be able to pass through the same, as may be demonstrated by holding such a piece of wire over a burning flame of gas.

By the use of this device the screw-plug in the aperture H may be drawn at any time with perfect safety from ignition. In addition I will here state that the lightest gravity of refined petroleum-oils held in an absorbed state, as heretofore described, placed in the open atmosphere, will only burn as any other matter highly charged with carbon, and can only be made explosive upon the same principle as that of water in a steam-boiler.

For the purpose of carbonizing coal-gas as distributed through the street-mains, and thence through the service-pipes into dwelling-houses, &c., I use the retort A, in all respects as heretofore described, without the appliance of any other appendage. I place the retort in any convenient place within the building and attach the service-pipe to the air-pipe F, by which the gas, after passing through the meter, is conveyed into the retort in the same manner as in the case of air, as described. It is also emitted through the distributer G, and is acted upon by oil or gasoline in the same manner as the air. By this process the volume of the gas is largely increased in its illuminating qualities—not less than from thirty to fifty per cent.—at a very trifling expense. The net saving by this process, as has been proved by practical tests, is not less than fifty per cent. on the average quantity of the coal-gas in cities, and in some cases one hundred per cent. has been attained. Much depends, however, upon the quantity and the price of the gas thus carbonized.

I have also discovered by practical tests that much depends, with respect to the illuminating qualities of the carbonized air and gas, upon the degrees of temperature. To illustrate. By using gasoline at a temperature of about 30° above 0 Fahrenheit, (which is supposed to be about the maximum of the lowest temperature in dwellings and other occupied buildings,) and gasoline of the gravity of 70°, the carbonized air would produce but a dim light and the coal-gas would be but slightly improved; but at the same temperature, if the gasoline be of a lighter gravity, the illumination would increase in proportion to the gravity of the gasoline used, and if the temperature were increased in the same ratio it would have the like effect—as, for instance, if the thermometer indicates 50° and upward, all grades of gasoline from 75° to 80° produce the desired result. But to obviate the difficulties originating from such emergencies, and for the purpose of keeping up the required degree of temperature in the absence of steam, I place a gas-burner within the base of and directly under the retort, as seen at C, which is supplied with carbonized air or gas by means of a tube, L, attached to the branch or service pipe K, which extends to and is attached to the pipe L' on the lamp C, thus supplying the burner with gas directly from the service-pipe instead from a gasometer. It will be seen that by this arrangement a gasometer becomes unnessary, thus dispensing with an appendage heretofore considered indipensable to all similar apparatus. The flow of gas through this tube is regulated by a stop-cock, and the lamp is only used when the state of the temperature requires it and when steam is not attainable.

Having thus described the process by which I carbonize atmospheric air and coal-gas by the use of refined petroleum, I will now proceed to describe the means by which I accomplish the same object by the use of crude petroleum. For this purpose I provide a filtering-tank, which may be placed at any convenient and safe locality. The bottom should be elevated above the bottom of the retort, and be connected with the same near the bottom by a tube, with a stop-cock and coupling attached. The said filtering-tank consists of a metallic vessel provided internally with two vertical wire-screen partitions, whereby it is divided into the chambers $b$, $b'$, and $b^2$. It is also provided with a perforated tube, N, on the bottom, the prolongation of which communicates with the bottom of the retort, and is provided with a stop-cock, $a'$. The chambers $b$ and $b'$ are filled with powdered pumice-stone, and a bag or bucket of screen-wire, M, is placed in the chamber $b^2$ in a manner to be readily taken out when desired. The oil is introduced into the wire-screen bag in the chamber $b^2$ and filtrates through the pumice-stone in the chambers $b$ and $b'$ into the tube N, by which it is conveyed into the retort. The filtering-vessel is also provided with a screen-wire sieve over the pipe N to prevent small particles of pumice-stone or any foul matter passing into the pipe.

The screen-wire bag or bucket may be taken out from time to time from the recess $b^2$ in the filtering-vessel to clean out the accumulations of foul matter separated from the oil.

The lamp $c$, under the retort, is provided with a wire-gauze outer shell, which is designed more especially for burning carbonized gas or air; but it may frequently be found more convenient to use petroleum-oil for heating the retort, for which I have devised the lamp A', (shown in Fig. 4,) which differs from the lamp c in the respect that it is provided with a sheet metal outer shell and with a siphon feeding-pipe, the outer end of which may be connected with a reservoir at the bottom of the same, the inner end terminating within the central wire-screen bucket, as shown in the drawings, the space between the bucket and outer wall being filled with pounded pumice-stone, by which the oil is taken up by absorption, and which serves as a wick to feed the flame around the top of the said open space.

Having thus described my invention, I claim as new and desire to secure by Letters Patent—

1. Saturating the pumice-stone and the series of corrugated porous bricks D, contained in the case A, with hydrocarbon liquid and drawing off the surplus liquid by means of the siphon-pipe I, communicating with the distributer G, as herein described, for the purpose specified.

2. The perforated distributer G, arranged in the bottom of the case beneath the pumice-stone and porous bricks D and above the coiled steam-pipe B, as herein described, for the purpose specified.

3. The construction and arrangement of the closed case filled with pumice-stone and the series of corrugated porous bricks D, the distributer G, coiled steam-pipe B, siphon-pipe I, the air-pipe F, extending through the centers of the porous bricks D, the discharge-pipe K, the air-vessel A, all operating as described, whereby no accumulation of gas is effected, as herein set forth.

MATTHIAS P. COONS.

Witnesses:
  WM. F. MCNAMARA,
  ALEX. F. ROBERTS.